US010831837B2

(12) United States Patent
Mauge (10) Patent No.: US 10,831,837 B2
(45) Date of Patent: Nov. 10, 2020

(54) POPULATION OF SETS USING ADVANCED QUERIES

(75) Inventor: Karin Mauge, Los Altos, CA (US)

(73) Assignee: eBay Inc., San Jose, CA (US)

( * ) Notice: Subject to any disclaimer, the term of this patent is extended or adjusted under 35 U.S.C. 154(b) by 1329 days.

(21) Appl. No.: 12/610,038

(22) Filed: Oct. 30, 2009

(65) Prior Publication Data

US 2011/0106828 A1 May 5, 2011

(51) Int. Cl.
*G06F 16/951* (2019.01)
*G06F 16/33* (2019.01)
*G06F 16/338* (2019.01)
*G06F 16/332* (2019.01)
*G06F 16/30* (2019.01)

(52) U.S. Cl.
CPC ............ *G06F 16/951* (2019.01); *G06F 16/30* (2019.01); *G06F 16/33* (2019.01); *G06F 16/338* (2019.01); *G06F 16/3322* (2019.01)

(58) Field of Classification Search
CPC ...... G06F 17/2795; G06F 16/30; G06F 16/33; G06F 16/338; G06F 16/358; G06F 16/3322; G06F 16/951
USPC .................................................. 707/707, 708
See application file for complete search history.

(56) References Cited

U.S. PATENT DOCUMENTS

| | | | | |
|---|---|---|---|---|
| 5,778,363 A | * | 7/1998 | Light | G06F 17/30699 |
| 8,285,745 B2 | * | 10/2012 | Li | G06F 17/30672 707/706 |
| 9,519,716 B2 | * | 12/2016 | Athsani | G06F 17/30867 |
| 2005/0216457 A1 | * | 9/2005 | Walther | G06F 17/30696 |
| 2006/0161520 A1 | * | 7/2006 | Brewer et al. | 707/3 |
| 2007/0038602 A1 | * | 2/2007 | Weyand | G06F 16/951 |
| 2007/0271241 A1 | * | 11/2007 | Morris | G10L 15/26 |
| 2007/0294200 A1 | * | 12/2007 | Au | G06F 16/338 706/55 |
| 2008/0263023 A1 | * | 10/2008 | Vailaya | G06F 17/30675 |
| 2009/0094221 A1 | * | 4/2009 | Cameron | G06F 16/3322 |
| 2009/0150375 A1 | * | 6/2009 | Mityagin et al. | 707/5 |
| 2010/0017395 A1 | * | 1/2010 | Wayn | G06F 17/30386 707/E17.014 |

\* cited by examiner

*Primary Examiner* — James Trujillo
*Assistant Examiner* — Fariborz Khoshnoodi
(74) *Attorney, Agent, or Firm* — Shook, Hardy & Bacon L.L.P.

(57) ABSTRACT

A method and a system are described for generation of sets of alternative terms based on queries received from users. For example, a query module may receive a query comprising syntax indicating alternative terms and may parse the alternative terms from the query. A frequency module forms groups of alternative terms from the parsed alternative terms and determines a first number of occurrences corresponding to each of the groups based on the received query and previous queries. For a first pair of the groups comprising a first alternative term and a second alternative term, a threshold module adds the first alternative term to an existing set of terms that already includes the second alternative term. The addition is based on a second number of occurrences of the first alternative and at least one other member of the existing set of terms.

21 Claims, 6 Drawing Sheets

POPULATION OF SETS USING ADVANCED QUERIES

TECHNICAL FIELD

The present application relates generally to the technical field of data analysis and, in one specific example, to generating more robust search results using sets of alternative terms.

BACKGROUND

An online publishing system may receive publication data from multiple users, where each instance of publication data describes, for example, an item to be sold. The publication data may be associated with products that, in turn, are organized by attributes so that users can more easily find what they are looking for and/or a possible substitution for the item sought. The attributes may be used to, for example, populate a catalog that is organized into a hierarchy based on one or more attributes of the products.

BRIEF DESCRIPTION OF THE DRAWINGS

Some embodiments are illustrated by way of example and not limitation in the figures of the accompanying drawings in which.

DETAILED DESCRIPTION

Example methods and systems to populate sets of alternative terms used in search queries are described. In the following description, for purposes of explanation, numerous specific details are set forth in order to provide a thorough understanding of example embodiments. It will be evident, however, to one skilled in the art that the present invention may be practiced without these specific details. The term "item" is used to refer to the specific object or service identified in a publication data (e.g., a listing) while the term "product" is used to refer more generically to multiple items or services that are determined to be identical or substantially similar based on, for example, an ISBN number model number, bar code, and/or some other attribute.

In an online publishing system, listings of items for sale and queries for items for sale may be received from many users. The listings and queries may not describe similar items or even identical items using the same terms or words. In some instances, users may use the same terms and words to describe dissimilar items. Further, it may not immediately apparent to a potential buyer that a seller may have used other terms to describe the item sought or what terms are appropriate substitutes. To make the items for sale more accessible to potential buyers, it may be desirable to add or suggest alternative search terms to a query using commonly-used alternatives to provide additional, relevant search results.

Divergence between terms used in listings and search queries may be particularly troublesome in generating a catalog of products that represent items for sale in each of the various listings. Generating sets of words may be helpful to avoid duplication in the catalog and/or to avoid improperly combining listings.

Platform Architecture

Figure 1:
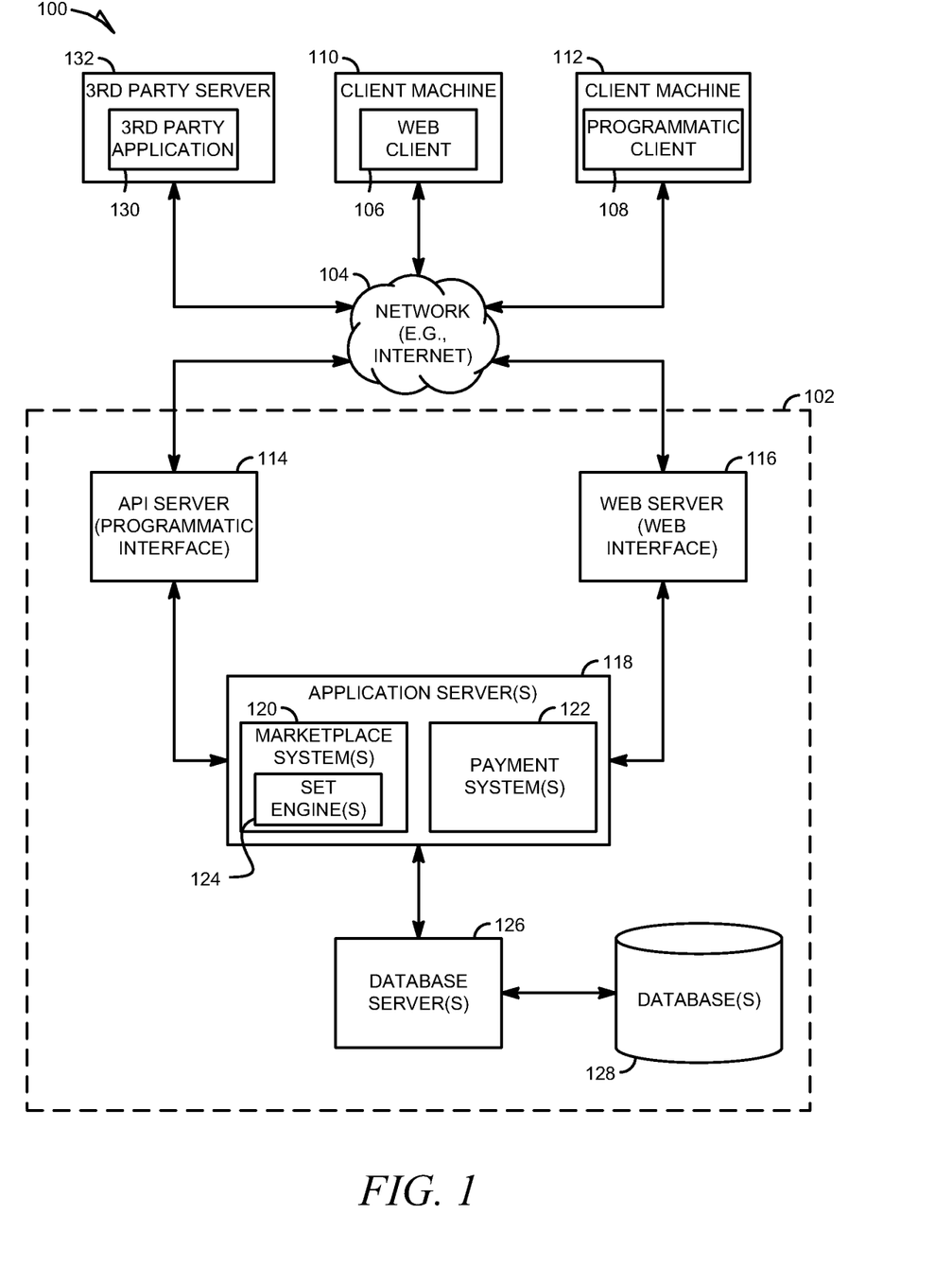
FIG. 1 is a network diagram depicting a client-server system, within which one example embodiment may be deployed.

FIG. 1 is a network diagram depicting a client-server system 100, within which one example embodiment may be deployed. A networked system 102, in the example form of a network-based publication system (e.g., publication system), provides server-side functionality, via a network 104 (e.g., the Internet or a wide area network (WAN)) to one or more clients. FIG. 1 illustrates, for example, a web client 106 (e.g., a browser, such as the INTERNET EXPLORER® browser developed by Microsoft Corporation of Redmond, Wash. State) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more publication systems 120 and payment systems 122. The application servers 118 are, in turn, shown to be coupled to one or more database servers 126 that facilitate access to one or more databases 128.

The publication systems 120 may, in one example, provide a number of publication functions and services to users that access the networked system 102. The publication systems 120 may comprise one or more set engines 124 that may be operable to generate one or more sets of words used to describe items or products. The payment systems 122 may likewise provide a number of payment services and functions to users. The payment systems 122 may allow users to accumulate value (e.g., in a commercial currency, such as the U.S. dollar, or a proprietary currency, such as "points") in accounts, and then later to redeem the accumulated value for products (e.g., goods or services) that are made available via the publication systems 120. While the publication and payment systems 120 and 122 are shown in FIG. 1 to both form part of the networked system 102, it will be appreciated that, in alternative embodiments, the payment systems 122 may form part of a payment service that is separate and distinct from the networked system 102.

Further, while the system 100 shown in FIG. 1 employs a client-server architecture, the present embodiments are of course not limited to such an architecture, and could equally well find application in a distributed, or peer-to-peer, architecture system, for example. The various publication and payment systems 120 and 122 could also be implemented as standalone software programs, which do not necessarily have networking capabilities.

The web client 106 accesses the various publication and payment systems 120 and 122 via the web interface supported by the web server 116. Similarly, the programmatic client 108 accesses the various services and functions provided by the publication and payment systems 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 130, executing on a third party server machine 132, as having programmatic access to the networked system 102 via the programmatic interface provided by the API server 114. For example, the third party application 130 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
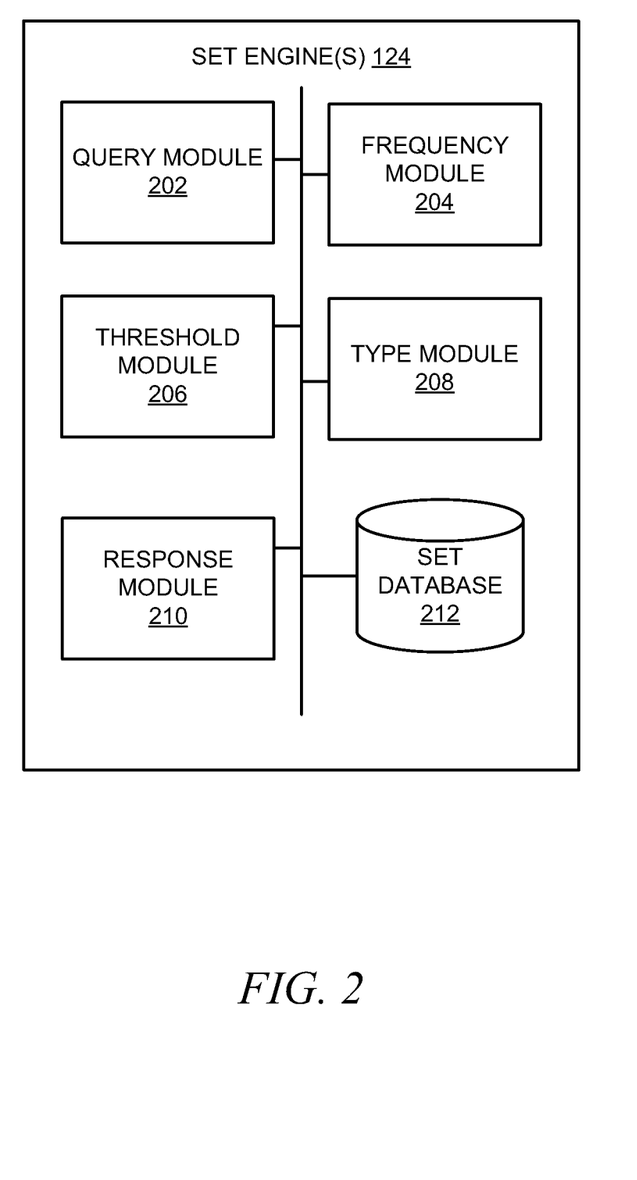
FIG. 2 is a block diagram depicting the set engines that, in one embodiment, are provided as part of the client-server system of FIG. 1.

FIG. 2 is a block diagram for exemplary set engines 124, according to various embodiments. Set engines 124 may operate within the publication systems 120 to determine whether various terms are interchangeable with other terms in specific contexts. The sets may include, for example, interchangeable words, alternative values associated with a single attribute, or other sets of related words. By connecting terms to one another, the set engines 124 may operate to help a seller associate a listing to a product and/or to direct a potential buyer to one or more listings that correspond to a desired product. The sets may be used to improve catalogs that may, in turn, each be associated with a specific product domain. Examples of product domains may include, for example, electronics, apparel, jewelry, toys, automotive, etc. The catalogs may be organized, for example, in a hierarchy, table structure, or other data structure known to those skilled in the art.

The set engines 124 receive search queries from users of the networked system 102 as input data. The search queries are developed by users to identify listings for products that the user is interested in buying and/or selling. The queries may or may not be domain-specific. Based on the queries and/or the domains associated with the queries, existing sets may be modified and/or new sets may be generated. The sets themselves may or may not be domain-specific. The set engines 124 may store the sets in a database that is accessed in response to subsequent queries from users. Further, and specifically in regard to generating and maintaining catalogs of products, the sets may be used to avoid duplicative catalog products and/or improperly combining listings into one product.

The set engines 124 may comprise a query module 202, a frequency module 204, a threshold module 206, a type module 208, a response module 210, and a set database 212.

The query module 202 may receive one or more queries from the client machines 110 and 112. The queries may be submitted by one or more human users to, for example, locate one or more products and/or listings within the publication system 120. The queries may include one or more keywords. In some instances, the queries may include one or more Boolean operators (e.g., AND, OR, NOT) and/or one or more other operators or syntax to further specify the search terms such as parenthesis, quotation marks, wildcard symbols, or the like. In some instances, operators may be added to a received query according to a set of default rules (e.g., a space between keywords operates as an "AND" operator).

Particularly, advanced users may provide operators indicating that one or more terms are to be considered as alternatives (e.g., these terms should be connected using an "OR" operator). Example syntaxes to indicate that terms "x," "y," and "z" should be considered in the alternative that may be used includes:

x OR y OR z

[x+y+z]

(x, y, z)

It is noted that additional syntaxes that may be used will be apparent to those skilled in the art. Embodiments may include the use of one or more syntaxes to indicate alternatives.

The query module 202 may, upon receipt of the queries, identify the syntaxes to indicate alternatives within the query. The query module 202 parses these syntaxes and the terms that are included as alternatives. The query module 202 may additionally associate the alternatives to a particular domain if the search was limited to the domain. For example, in an apparel domain, the term "lavender" may be associated with alternatives such as "purple," "lilac," and "mauve." In the plant domain, the same term, "lavender" may be associated with alternatives such as "french lavender," "lavende," and "lavengulate."

In some instances, the query module 202 may parse queries received from users who have been identified as being "advanced." A user may be an advanced user based on a user history such as having previously used the syntax to indicate alternatives, having a known selling or buying history, and/or other factors. The queries from the advanced users may be parsed exclusively from queries from other users or may be parsed before queries from other users. In some instances, queries from advanced users may be assigned a weighting factor by the query module 202.

The frequency module 204 receives the parsed alternative terms and the domain (if one is associated with the parsed alternative terms). The frequency module 204 divides the terms within one query into pairs (or groups) of terms for analysis. To illustrate, the alternative terms x, y, and z are divided into the pairs:

(x, y)

(y, z)

(x, z)

In some instances, every possible pair is formed (as shown above). In other instances, only a portion of the pairs are formed. Some pairs may not be formed based on one or more heuristics. For example, a pair may not be formed if the terms do not begin with the same letter.

Having formed the pairs, the frequency module 204 then compares each pair to determine if the pair has previously been included as alternatives in another query and, if so, to increment a counter of the number of occurrences of the pair in queries received at the query module 202. If the pair has not been previously used, the pair may be stored as a new pair and associated with an initial count of 1.

The threshold module 206 may compare the count of the number of occurrences to a threshold value. The threshold may be predetermined. In some embodiments, the threshold may depend on the domain associated with the query. The threshold module 206, when the threshold is met by a pair, may add each of the terms to one or more target sets based on the set(s) that the other member of the pair currently belongs. To illustrate, if the number of occurrences of pair (x, y) meets the threshold, and x belongs to the existing set (t, u, v, w, x), the term y may be added to form target set (t, u, v, w, x, y).

In some instances, prior to adding a term to a set, further determinations may be made by the threshold module 206 that the term to be added has additionally been included with other existing member(s) of the target set in other queries. To continue the above example, the following pairs may be formed:

(t, y)
(u, y)
(v, y)
(w, y)

A number of occurrences of each of these pairs may then be compared to a threshold. This threshold may be the same as, or different from, the threshold that was compared to the pair (x, y). If one or more of these pairs meets the threshold, the term (e.g., y) is added to the existing set and the target set is stored. If a requisite number of these pairs do not meet the threshold, the term is not added to the set. It is noted that statistical algorithms may be used additionally or alternatively to the thresholds discussed here.

The type module 208, based at least in part on the pairs formed by the threshold module 206, may assign a "type" to each target or existing set as metadata associated with the set. In these instances, each set is identified as a particular type of set. Types of sets may include, for example, synonyms, attribute values, acronyms, misspellings, or the like. Synonym sets may be particularly helpful, for example, in domains or instances where the user has a relatively high amount of freedom in choosing terms such as clothing colors. Domain-specific synonym sets may be used for industry specific terms. For example, in the shoes domain, a synonym set may include the terms "new," "NIP," "DS," and "NOS" whereas in the video games context, "DS" would be associated with "dual screen." The attributes may include, for example, specifications such as dimensions, brand name, condition, and the like, that have a specific value to describe the product. For example, in the "shoes" domain, a set may include the terms "Nike," "Adidas," "New Balance," "Asics," and "Reebok" as brands of running shoes. Examples of acronyms may include a set that includes the acronym and its definition, such as a set including "LOTR" and "Lord of the Rings." Misspelling sets may be used to correct common misspellings or nicknames used in listings and/or queries. For example, a set for the term "Birkenstock" may include "Birkenstock," "Berkinstock," "Berks," and the like.

The sets are stored in a set database 212. The set database 212 may be accessed to add a new set, delete a set, modify or replace a set, or to control metadata with a set. The set database 212 may be accessed by a response module 210 to respond to queries. In some instances, the response module 210 may transform a subsequent query by incorporating the sets into the query before the results presented to the user (e.g., sets including misspellings). In other instances, terms in the sets may be presented to the users as possible alternatives to expand or narrow a search (e.g., sets of attribute values, via a graphical user interface (GUI)).

The set engines 124 may include additional and/or alternative modules to perform the functions described above. In some instances, other modules and/or other engines or applications in the publication systems 120 may be used in addition to, or alternatively to, the set engines 124.

Flowcharts

Figure 3:
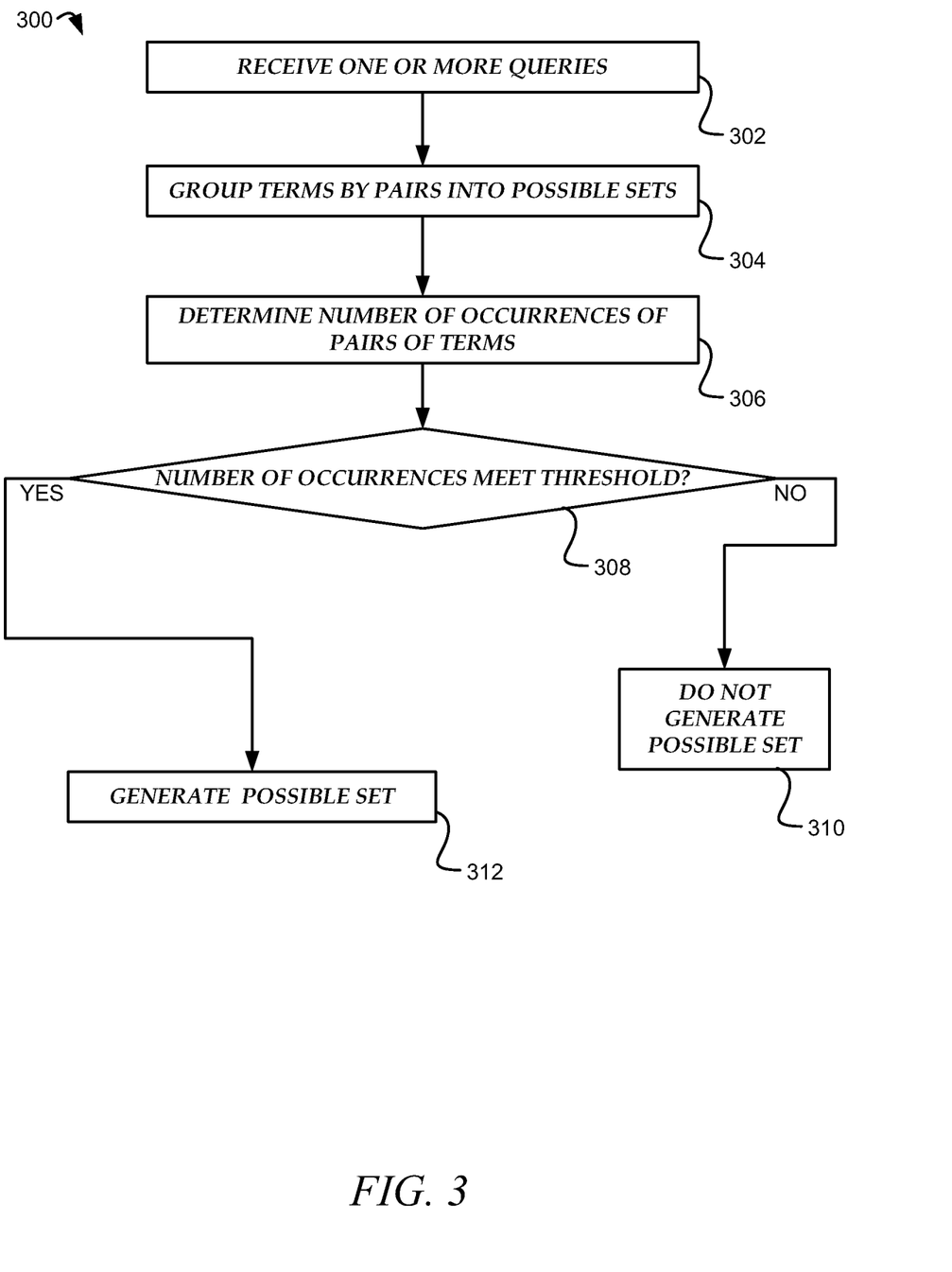
FIG. 3 is a flowchart of an exemplary process for making a determination to generate a set, according to various embodiments.

FIG. 3 is a flowchart of an exemplary process 300 for making a determination to generate a possible set, according to various embodiments. The process 300 may be performed by the set engines 124. In some instances, the process 300 is performed as queries are received. In other instances, the process 300 is performed once a predetermined number of queries are received.

In an operation 302, one or more queries are received by the query module 202. The queries may or may not be associated with a particular domain. The queries include one or more possible alternatives. The syntax used in the queries to indicate alternatives may vary based on, for example, user preferences, geographic region, user language, the networked system 102, etc.

In an operation 304, the terms in the queries that are possible alternatives are grouped by pairs into possible sets by the frequency module 204. The grouping may be performed for each possible pair. In some instances, some terms may not be paired if, for example, the terms do not begin with the same letter. In an operation 306, the number of occurrences of each of the pairs of terms is determined by the frequency module 204.

In an operation 308, the number of occurrences for each pair of terms is compared to a threshold by the threshold module 306. The number of occurrences and/or the threshold may or may not be associated with a domain or a type of set. It is noted that other algorithms may alternatively or additionally be used to make the determination of operation 308. Other algorithms that may be used include heuristics, probability calculations (e.g., correlations), and artificial intelligence systems (e.g., neural networks).

In an operation 310, if the number of occurrences does not meet the appropriate threshold, the pair is not used to generate a possible set. In some instances, the pair may be stored by the threshold module 206 to be compared to later pairs generated from subsequent queries. In other embodiments, the pair is previously associated with a counter to count the number of occurrences and the counter may be incremented.

In an operation 312, if the number of occurrences does meet the threshold, the pair is identified as a possible set by the threshold module 206. The pair, if it has been previously identified as a possible set, may be compared to currently existing sets, and, if it is previously incorporated into those sets, may be deleted. If it has not been previously identified as a possible set, may be further analyzed in the process 400 as discussed in connection with FIG. 4.

Figure 4:
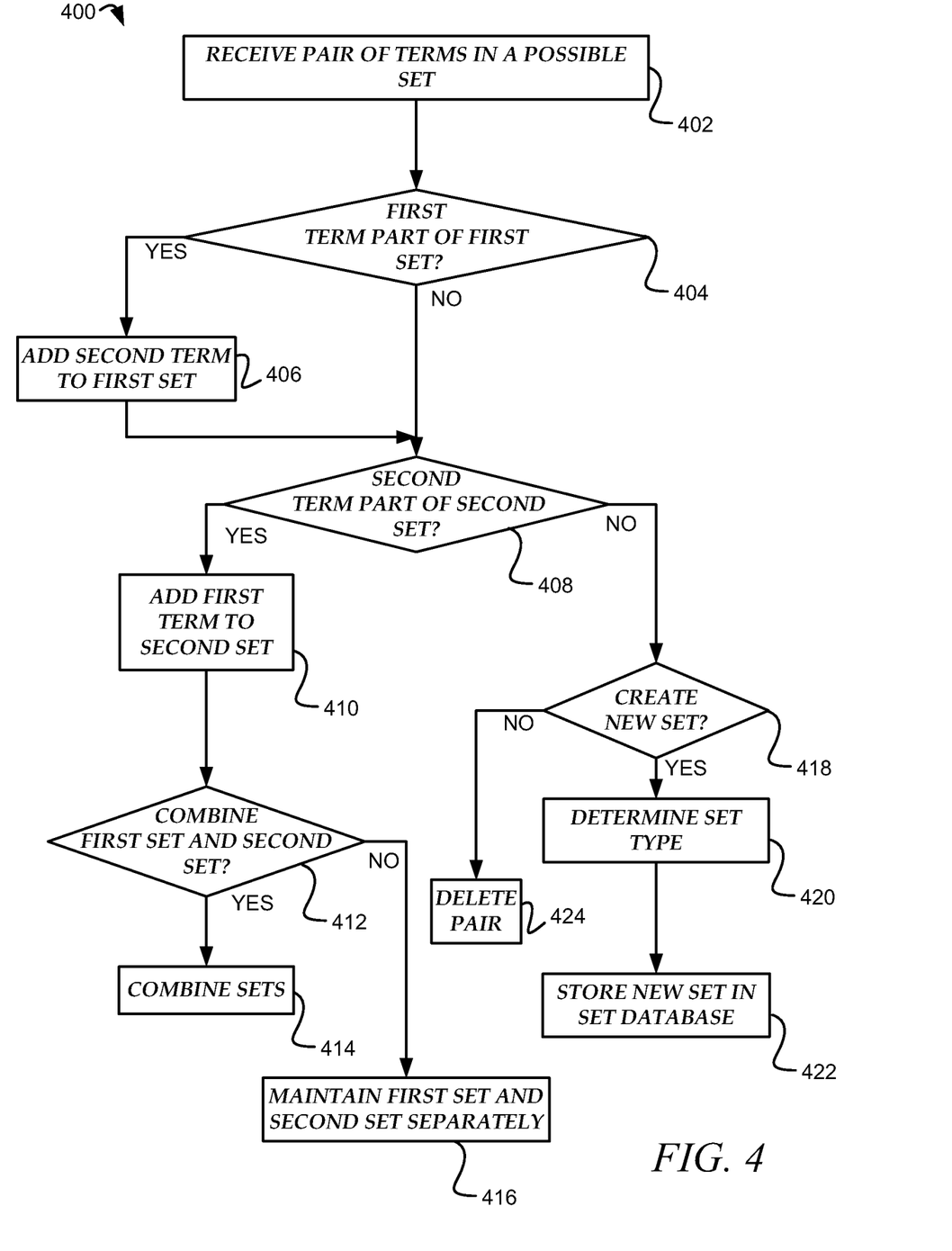
FIG. 4 is a flowchart of an exemplary process for making a determination to add a term to an existing set.

FIG. 4 is a flowchart of an exemplary process 400 for making a determination to add a term to an existing set. The process 400 may be performed subsequent to the process 300 if the process 300 identifies a possible set. The process 400 may be performed by the frequency module 204, the threshold module 206, and/or the type module 208.

In an operation 402, a possible set generated by process 300 is received. The possible set includes a pair of terms that has occurred as alternative terms a predetermined number of times in queries submitted by users.

In an operation 404, a first term of the pair of terms is compared to other terms in an existing set to which the second term in the pair belongs to determine if the first term is part of the first set. The comparison may be based on, for example, a number of occurrences in which the first term has appeared with each of the other terms in the existing first set. These occurrences may be analyzed in various ways. For example, the occurrences may be aggregated into a final count, may be considered on a term-by-term basis (e.g., 50% of the terms have occurred with the new term at least five times), or by some other calculation. If the first term occurs a sufficient number of times with enough of the other terms in the set, the first term is added to the first set in an operation 406. Operations 404 and 406 may be repeated for each existing set to which the second term belongs.

In an operation 408, a determination is made that the second term of the pair is to be added to a second existing set to which the first term belongs. The determination may be made as described in connection with operation 404. Like operation 406, the second term may be added to the second set in an operation 410. Likewise, operations 408 and 410 may be repeated for each existing set to which the second term belongs.

In an operation 412, if the first term is added to a first set and a second term is added to a second set, a determination may be made to combine the first set and the second set. The determination of operation 412 may be performed similar to the determinations of operations 404 and 408. More specifically, each term (or a portion of the terms) of each set may be compared to each term (or a portion of the terms) of each set to determine a number of occurrences of the terms as possible alternatives in queries. If these occurrences are sufficient to meet a threshold (or another measure), the first set and the second set are combined in an operation 414. If not, or if the first set and the second set are of different types (e.g., the first set includes common misspellings and the second set includes synonyms), the first set and the second set are maintained separately in an operation 416.

In an operation 418, a determination may be made to create a new set. In some instances, the new set may be created if neither the first term nor the second term can be added to an existing set. In other instances, a determination may be made, based on one or more heuristics, that the paired terms should not be associated with one another in a set to, for example, maintain the integrity of a set type. For example, if one term is a misspelling of a brand name and the other term is a domain-specific acronym, the terms may not be combined into a set.

If the determination is made to create a new set, a set type may be determined in an operation 420. The set type may be based on one or more heuristics, a learning algorithm, properties of similar sets, or the like. A domain associated with the set may also be identified in the operation 420. In an operation 422, the new set is stored in a database such as the sets database 212. If no new set is created, the pair is deleted in an operation 424.

Data Structures

Figure 5:
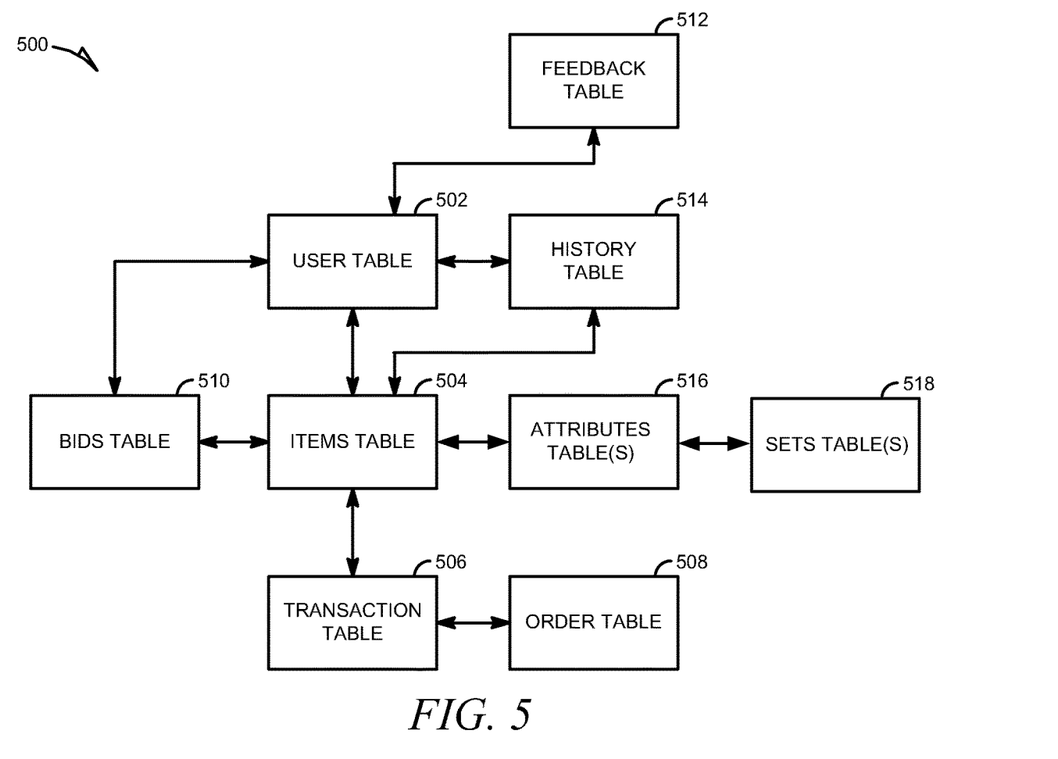
FIG. 5 is a high-level entity-relationship diagram, illustrating various tables that may be maintained.

FIG. 5 is a high-level entity-relationship diagram, illustrating various tables 500 that may be maintained within the databases 128 and that are utilized by and support the systems 120 and 122. A user table 502 contains a record for each registered user of the networked system 102, and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items that are offered for sale by the networked system 102.

The tables 500 also include an items table 504 in which item records are maintained for goods and services that are available to be, or have been, transacted via the networked system 102. Each item record within the items table 504 may furthermore be linked to one or more user records within the user table 502, so as to associate a seller and one or more actual or potential buyers with each item record.

A transaction table 506 contains a record for each transaction (e.g., a purchase or sale transaction) pertaining to items for which records exist within the items table 504.

An order table 508 is populated with order records, each order record being associated with an order. Each order, in turn, may be generated in association with to one or more transactions for which records exist within the transaction table 506.

Bid records within a bids table 510 each relate to a bid received at the networked system 102 in connection with an auction-format listing. A feedback table 512 is utilized by one or more reputation engines 208, in one example embodiment, to construct and maintain reputation information concerning users. A history table 514 maintains a history of transactions to which a user has been a party. One or more attributes tables 516 record attribute information pertaining to items for which records exist within the items table 504. Considering only a single example of such an attribute, the attributes tables 516 may indicate a currency attribute associated with a particular item, the currency attribute identifying the currency of a price for the relevant item as specified in by a seller.

Sets tables 518 may each relate one or more terms to one or more sets. Each set may, in turn, be associated with a domain and/or a set type. The sets tables 518 may be stored in the databases 128 and/or the set database 212.

Figure 6:
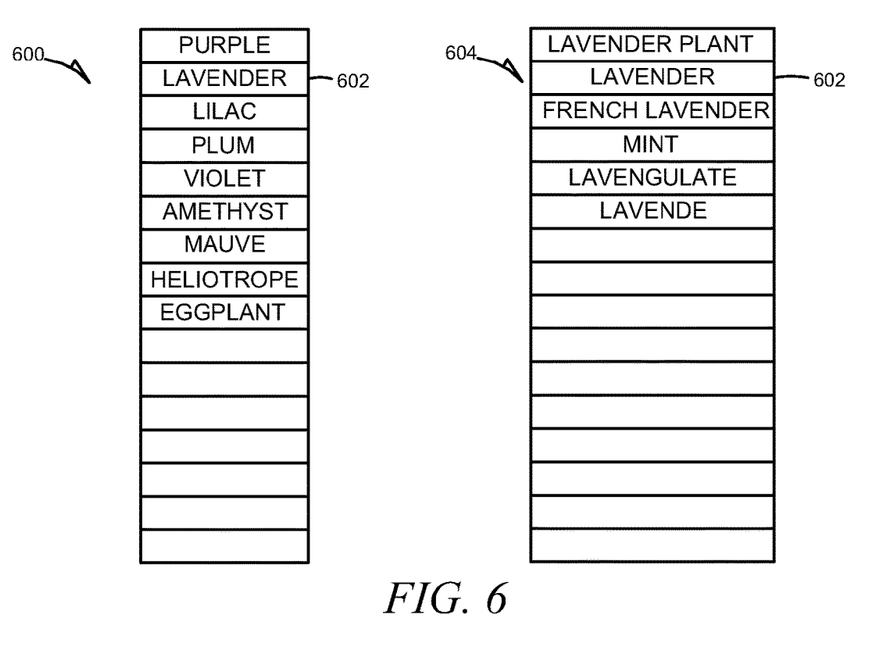
FIG. 6 provides further details regarding the product tables and catalog tables that are shown in FIG. 5, to be maintained within the databases.

FIG. 6 provides further details regarding the maintenance of sets tables 518. The sets tables 518 (e.g., table 600 and table 604) may each store data about the terms within each generated set. For example, each field (e.g., field 602) may store a term (e.g., "lavender") corresponding to a member of a set. The table 600, for example, may belong to domain "clothing" and be of the type "synonyms." More specifically, the table 600 includes synonyms for the color purple as used in connection with clothing. The table 604, however, belongs to domain "plants" and is of the type "synonyms." While table 604 also includes the term "lavender," the other terms included in table include other words and phrases that may also be used to describe a lavender plant.

Some instances of the embodiments described herein may be used to solve various technical problems such as reducing a number of queries performed on a database, reducing network traffic, and to increase the usability of a user interface for searching a database.

Figure 7:
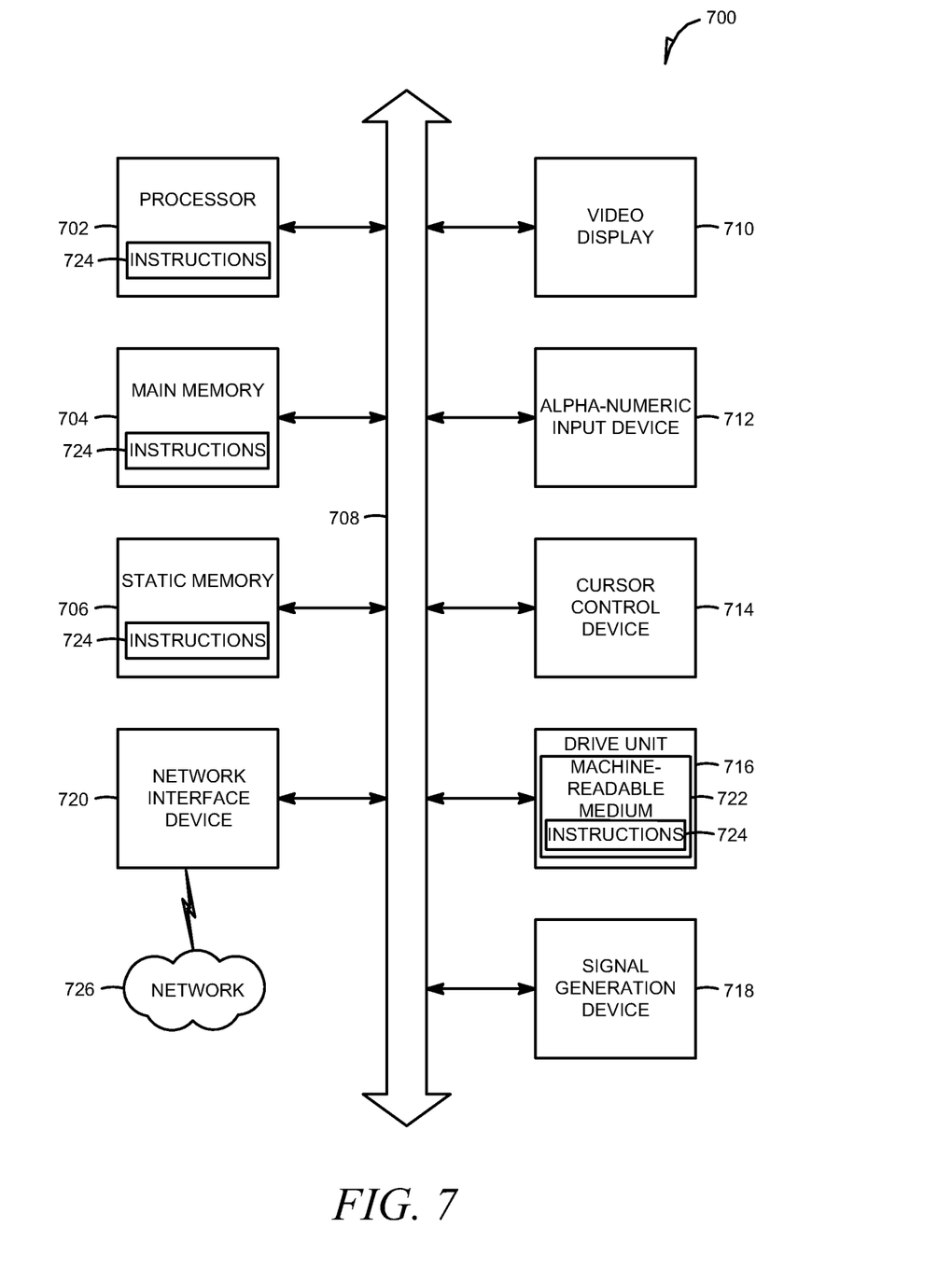
FIG. 7 shows a diagrammatic representation of a machine in the example form of a computer system within which a set of instructions, for causing the machine to perform any one or more of the methodologies discussed herein, may be executed.

FIG. 7 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 (and/or the static memory 706) and/or within the processor 702 during execution thereof by the computer system 700, with the main memory 704 and the processor 702 also constituting machine-readable media.

The software 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain embodiments are described herein as including logic or a number of components, modules, or mechanisms. Modules may constitute either software modules (e.g., code embodied on a machine-readable medium or in a transmission signal) or hardware modules. A hardware module may be a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs.)

Thus, a method and system to determine suitability of divergent listings in catalog generation have been described. Although the present invention has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A server computer comprising:
    a processor; and
    a computer readable medium, coupled with the processor, the computer readable medium storing instructions to be executed by the processor to perform operations comprising:
    receiving a query in an online publishing system, the query comprising a plurality of terms including syntax input by a user indicating that at least a first term and a second term are alternative terms in the plurality of terms;
    parsing the plurality of terms included in the query to determine that the first term and second term are alternative terms;
    associating the first term and the second term included in the query to a particular product domain associated with the query;
    forming a group comprising the first term and the second term included in the query;
    comparing the group comprising the first term and second term included in the query to queries received by the online publishing system;
    determining a number of occurrences where the group comprising the first term and the second term has previously been included in queries received by the online publishing system;
    comparing the number of occurrences of the group comprising the first term and the second term in queries received by the online publishing system to a threshold value for the product domain associated with the query;
    determining that the number of occurrences meets the threshold value for the product domain associated with the query;
    determining that the first term of the query belongs to at least a first existing set of s stored in a database that does not include the second term;
    adding the second term of the query to the first existing set of terms to form an updated first existing set of terms that includes the second term; and
    storing, in the database, the updated first existing set of terms, wherein the updated first existing set of terms stored in the database is accessed to respond to subsequent queries.

2. The server computer of claim 1, the instructions further comprising:
    transforming a subsequent query based on the updated first existing set of terms.

3. The server computer of claim 2, wherein the subsequent query is transformed without further input from a user.

4. The server computer of claim 2, wherein the subsequent query is transformed via a user interface and to indicate the first term and at least one other term of the updated first existing set of terms.

5. The server computer of claim 1, the instructions further comprising:
    identifying a type of the first existing set of terms.

6. The server computer of claim 1, before parsing the plurality of terms included in the query, the instructions further comprising:
    identifying queries based on a user that submitted the query; and
    parsing the plurality of terms included in the query based on a determination that the user previously used syntax in one or more of the queries to indicate alternative terms.

7. A method comprising:
    receiving, at a server computer in an online publishing system, a query comprising a plurality of terms including syntax indicating that at least a first term and a second term are alternative terms in the plurality of terms;
    parsing the plurality of terms included in the query to determine that the first term and second term are alternative terms;
    associating the first term and the second term included in the query to a particular product domain associated with the query;
    Forming a group comprising the first term and the second term included in the query;
    comparing the group comprising the first term and second term included in the query to queries received by the online publishing system;
    determining a first number of occurrences where the group comprising the first term and the second term has previously been included in queries received at the online publishing system;
    comparing the number of occurrences of the group comprising the first term and the second term in queries received by the online publishing system to a threshold value for the product domain associated with the query;
    determining that the number of occurrences meets the threshold value for the product domain associated with the query;
    determining that the first term of the query belongs to at least a first existing set of s stored in a database that does not include the second term;
    adding the second term of the query to the first existing set of terms to form an updated first existing set of terms that includes the second term; and
    storing, in the database, the updated first existing set of terms, wherein the updated first existing set of terms stored in the database is accessed to respond to subsequent queries.

8. The method of claim 7, further comprising transforming a subsequent query based on the updated first existing set of terms.

9. The method of claim 8, wherein the operation of transforming of the subsequent query is performed without further input from a user.

10. The method of claim 8, wherein the operation transforming of the subsequent query comprises providing a user interface and indicating the first term and at least one other term of the updated first existing set of terms.

11. The method of claim 7, further comprising identifying a type of the first existing set of terms.

12. The method of claim 11, wherein the operation of identifying a type of the existing set of terms further comprises determining that the first term is of the same type as at least one other alternative term of the first existing set of terms.

13. The method of claim 7, wherein the first existing set of terms is associated with one or more products in a catalog.

14. A machine-readable storage medium having e r bodied thereon instructions executable by a processor to perform operations comprising:
- receiving a query in an online publishing system, the query comprising a plurality of terms including syntax indicating that at least a first term and a second term are alternative terms in the plurality of terms;
- parsing the plurality of terms included in the query to determine that the first term and the second term are alternative terms;
- associating the first term and the second term included in the query to a particular product domain associated with the query;
- forming a group comprising the first term and the second term included in the query;
- comparing the group comprising the first term and second term included in the query to queries received by the online publishing system;
- determining a number of occurrences where the group comprising the first term and the second term has previously been included in queries received by the online publishing system;
- comparing the number of occurrences of the group comprising the first term and the second term in queries received by the online publishing system to a threshold value for the product domain associated with the query;
- determining that the number of occurrences meets the threshold value for the product domain associated with the query;
- determining that the first term of the query belongs to at least a first existing set of terms stored in a database that does not include the second term;
- adding the second term of the query to the first existing set of terms to form an updated first existing set of terms; and
- storing, in the database, the updated first existing set of terms, wherein the updated first existing set of terms stored in the database is accessed to respond to subsequent queries.

15. The method of claim 7, further comprising:
- determining a second number of occurrences of the second term in the queries received the online publishing system and that included at least one other term belonging to the first existing set; and
- adding the second term to the first existing set of terms based in part on the second number of occurrences.

16. The method of claim 7, wherein the threshold is a first threshold, and wherein prior to adding the second term to the first existing set of terms, the method further comprising:
- forming groups of alternative terms from the first existing set of terms and the second term;
- determining, for each group of the groups of alternative terms from the first existing set of terms and the second term, the number of occurrences in queries received by the online publishing system;
- determining, that a second threshold number of occurrences is met for one or more group of the groups of alternative terms from the first existing set of terms and the second term; and
- adding the second term to the first existing set of terms based on the determination that the second threshold number of occurrences is met.

17. The method of claim 7, wherein the threshold is a first threshold, and wherein prior to adding the second term to the first existing set of terms, the method further comprising:
- forming groups of alternative terms from the first existing set of terms and the second term;
- determining, for each group of the groups of alternative terms from the first existing set of terms and the second term, the number of occurrences in queries received by the online publishing system;
- determining, that a second threshold number of occurrences is not met for one or more group of the groups of alternative terms from the first existing set of terms and the second term; and
- determining not to add the second term to the first existing set of terms based on the determination that the second threshold number of occurrences is not met.

18. The method of claim 1, further comprising:
- identifying the query as an advanced query; and
- parsing the query before queries that are not identified as advanced.

19. The method of claim 18, wherein identifying the query as an advanced is based on user history of a user associated with the query.

20. The method of claim 18, further comprising assigning the query a weighting factor.

21. The server computer of claim 1, the operations further comprising:
- determining that the second term of the query belongs to at least a second existing set of terms stored in the database that does not include the first term;
- adding the first term of the query to the second existing set of terms to form an updated second existing set of terms; and
- storing in the database the updated second existing set of terms, wherein the updated second existing set of terms stored in the database is accessed to respond to subsequent queries.

* * * * *